(No Model.)
C. J. GARVEY.
CURRYCOMB.
No. 531,412. Patented Dec. 25, 1894.
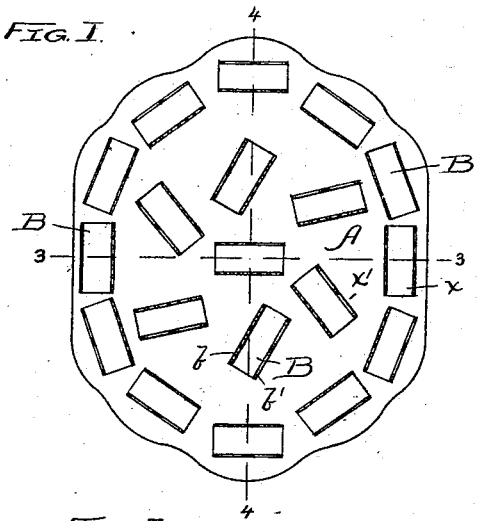
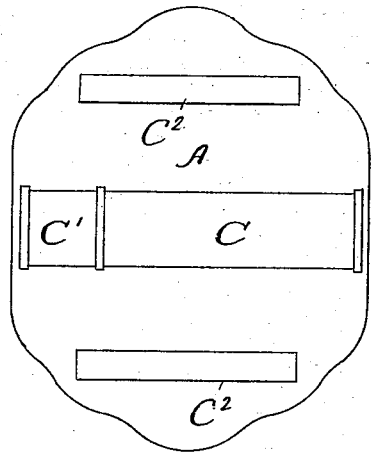
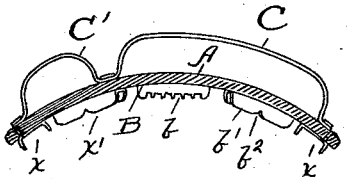
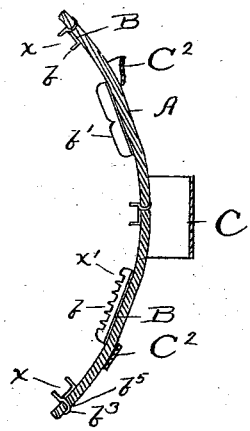
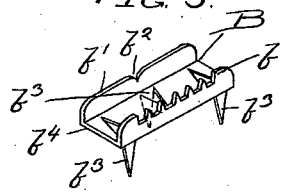
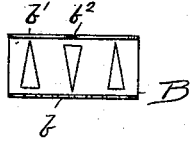
WITNESSES:
INVENTOR:
CHARLES J. GARVEY.
BY Munday, Evarts & Adcock.
HIS ATTORNEYS.

UNITED STATES PATENT OFFICE.

CHARLES J. GARVEY, OF CHICAGO, ILLINOIS, ASSIGNOR TO THE COLHOUN MANUFACTURING COMPANY, OF SAME PLACE.

CURRYCOMB.

SPECIFICATION forming part of Letters Patent No. 531,412, dated December 25, 1894.

Application filed October 15, 1894. Serial No. 525,896. (No model.)

*To all whom it may concern:*

Be it known that I, CHARLES J. GARVEY, a citizen of the United States, residing in Chicago, in the county of Cook and State of Illinois, have invented a new and useful Improvement in Currycombs, of which the following is a specification.

My invention relates to improvements in curry combs.

The object of my invention is to provide a curry comb of a simple, cheap, durable and efficient construction, which may be securely and easily held in the hand, and curved or shaped by the hand to perfectly conform to the limbs, joints or other parts of the animal to be curried, and which while operating perfectly to clean and smooth the coat of the animal, may be moved in any direction over the body, limbs or joints of the animal as may be most convenient to the operator, without danger of cutting or injuring the skin.

To this end my invention consists in the combination with a flexible pad of rubber fabric, or other like material, conforming substantially in shape to that of the hand when the fingers and thumb are somewhat spread or extended, of a series of short metallic clips secured to the flexible pad at divergent angles to each other, each of the short clips being provided with two upturned edges or right angle flanges, one of which is serrated or furnished with teeth and the other of which is smooth, both of the right angle flanges being of substantially the same width, so that the smooth flanges in connection with the divergent angles with which the series of clips are arranged will prevent any of the toothed or serrated edges from cutting, injuring or bearing too hard against the skin of the animal in whatever direction the curry comb as a whole may be moved over the surface of the animal, or to whatever part of the animal, whether leg, projecting joint or flat surface it is applied.

It further consists in the novel devices and novel combination of parts and devices herein shown and described, and particularly pointed out in the claims.

In the accompanying drawings, which form a part of this specification, I have shown at Figure 1 a front face or plan view of a curry comb embodying my invention; at Fig. 2, a back view. Fig. 3 is a cross section on line 3—3 of Fig. 1 and showing the curry comb curved transversely. Fig. 4 is a longitudinal section on line 4—4 of Fig. 1, and showing the curry comb curved longitudinally. Fig. 5 is a detail perspective view of one of the double edged or double flanged metallic clips, and Fig. 6 is a top or plan view of the same.

In the drawings A represents a hand-shaped flexible pad, preferably made of rubber fabric.

B B B are a series of short double flanged or double edged metallic clips, preferably formed of galvanized iron. These clips are preferably about nineteen in number, and are arranged at divergent angles to each other, so that the serrated edges of no two of them follow directly in line one with another. Each of these short metallic clips has an upturned serrated or toothed edge $b$, and an upturned smooth edge $b'$. The smooth edge $b'$ is preferably divided at the middle by a rounded notch or depression $b^2$. Each of the metallic clips B is also provided with two or more, preferably three, integral tongues or points $b^3$, stamped out of the body portion $b^4$ of the clip, and which are inserted through the flexible pad A and clinched on the back, as indicated at $b^5$, thus securing the double edged metallic comb clips B to the pad.

To enable the flexible pad to be easily and securely held in the hand, it is provided on the back near the middle with a hand-loop C through which the hand may be inserted, and with a thumb loop C', and also near the end with a loop $C^2$ for the ends of the fingers. The loop $C^2$ may be duplicated at the opposite end of the pad, as shown in Fig. 2. The thumb loop and hand loop may both preferably be formed from a single strap of leather or other similar material, as indicated in Fig. 3.

The short separate clips B are preferably arranged substantially as illustrated in Fig. 1, that is to say with a marginal row of clips around the margin of the pad, each of the clips in this marginal row $x$ being placed at an angle to those adjacent thereto, and with its smooth edge or flange $b'$ outward. The intermediate clips indicated at $x'$ are placed each at an angle to the radii, so that those on the opposite sides of the center do not follow in line with each other, and the radially opposite clips marked $x'$ $x'$ are so turned as to bring the serrated edge of one on the opposite side of the clip from that of the serrated edge of the other. The tongues $b^3$ are stamped out transversely to the length of the body portion $b^4$ of the clip, so as not to weaken the clip.

In my curry comb, by reason of the diverse arrangement of the short, narrow, straight, parallel flanged metallic comb clips at angles to each other, without rows of continuous open spaces between the clips across the pad in any direction, the pad may be moved in any and every direction without causing the straight toothed flanges to cut or injure the skin of the animal on the one hand, and without on the other hand leaving the coat of the animal in ridges or uncombed rows, as is necessarily the case where the clips are arranged in regular rows across the pad in some directions with rows of open spaces between the clips; and at the same time in my curry comb, owing to the diverse or non-row arrangement of the clips, the flexible pad is free to bend and conform itself in every direction to the surface or joint of the animal, under action of the hand much the same as though there were no metallic clips secured to it. Where the clips are arranged in regular rows across the pad, the rows of clips prevent the pad from bending with any facility except in directions at right angles to the rows of clips. By reason of the free open channels between the straight parallel flanges of the clips, and the short length of the clips, and the smooth edge of one of the flanges of each of the clips, the hair and dirt removed are readily cleaned or freed from the comb.

I claim—

1. The curry comb herein shown and described, consisting of a hand-shaped flexible pad provided with a series of narrow short rectangular metallic clips arranged over its surface at angles to each other, each having a toothed flange and a smooth edged flange, and an open channel between said flanges substantially as specified.

2. The combination with a hand-shaped flexible pad A, of a series of diversely arranged narrow short rectangular metallic clips B secured to said pad at angles to each other without rows of open spaces across the pad in any direction, each of said clips being provided with a toothed flange $b$ and a smooth edged flange $b'$, and integral tongues $b^3$ for securing the clip to the pad, said flanges being parallel to each other with an open channel between them, substantially as specified.

3. The combination with a hand-shaped flexible pad A provided with loops on its back for the hand and thumb, of a series of diversely arranged short narrow rectangular metallic clips B provided each with a toothed flange $b$ and a smooth flange $b'$ having a rounded notch $b^2$, each of said metallic clips having also integral tongues $b^3$ stamped out of the body portion $b^4$ of the clip, and each of said clips having an open channel between said flanges $b$ $b'$, substantially as specified.

4. The curry comb herein shown and described, and consisting of a hand-shaped flexible pad provided with a series of separate short narrow rectangular straight parallel flanged metallic comb clips secured thereto and arranged over the surface of the pad at angles to each other and without rows of open spaces across the pad in any direction, so that the toothed flange of one clip does not follow in line with that of another, to enable the curry comb to be moved in any direction over the body or limbs of the animal without injury thereto, substantially as specified.

5. The curry comb herein shown and described, consisting of a hand-shaped flexible pad provided with a series of separate short, narrow, straight parallel flanged rectangular metallic comb-clips secured thereto, each having a toothed flange $b$ and a smooth flange $b'$ and arranged over the surface of the pad at angles to each other in part in a marginal row and in part in an intermediate portion arranged at angles to the radii, the clips in the marginal row having their smooth flanges outermost, there being no continuous row of open spaces between the clips across the pad in any direction, substantially as specified.

6. The curry comb herein shown and described, consisting of a hand-shaped flexible pad provided with a series of separate short, narrow, straight parallel flanged rectangular metallic comb clips secured thereto, each having a toothed flange $b$ and a smooth flange $b'$ and arranged over the surface of the pad at angles to each other in part in a marginal row and in part in an intermediate portion arranged at angles to the radii, the clips in the marginal row having their smooth flanges outermost, and each of said clips having transversely stamped out integral tongues $b^3$ to secure the clips to the pad, there being no continuous rows of open spaces between the clips across the pad in any direction, substantially as specified.

CHARLES J. GARVEY.

Witnesses:
 H. M. MUNDAY,
 EDMUND ADCOCK.